Dec. 7, 1943.  C. D. RYDER  2,336,153
FASTENING DEVICE
Filed Dec. 13, 1941
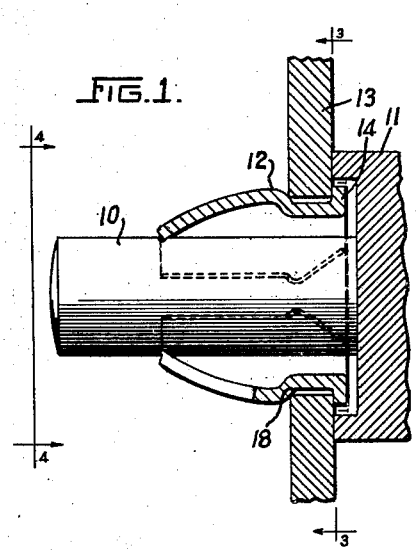
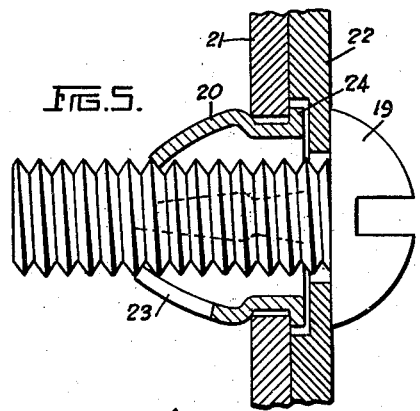
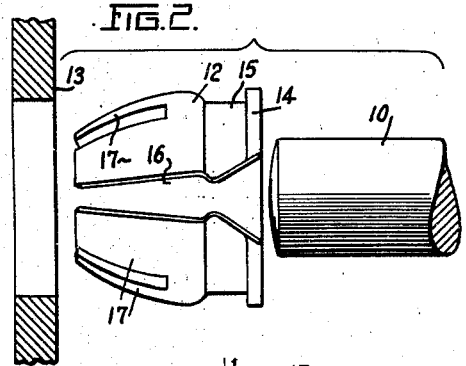
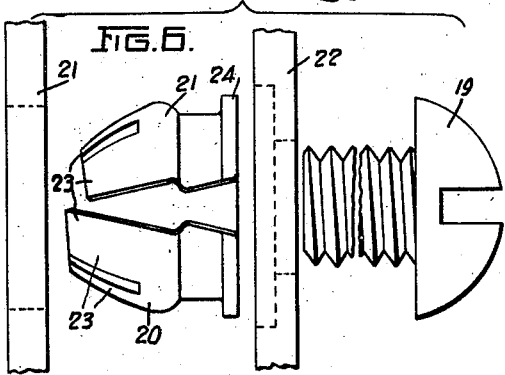
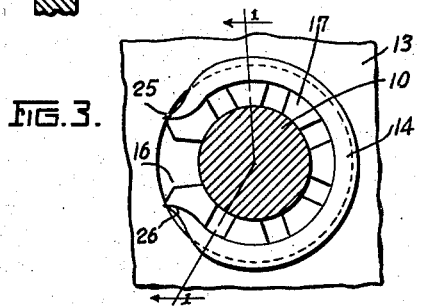
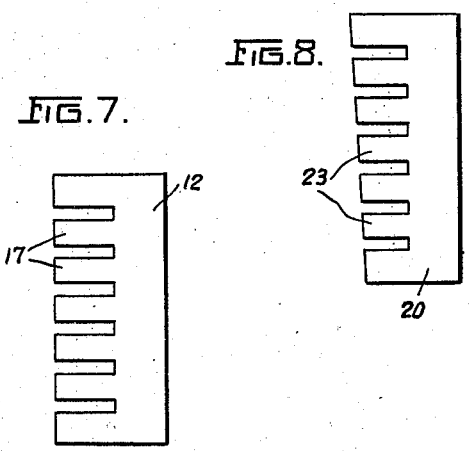
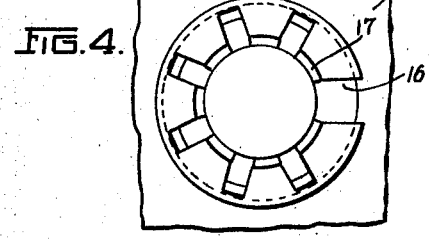
INVENTOR
CHARLES D. RYDER,
BY Toulmin + Toulmin
ATTORNEYS Patented Dec. 7, 1943

2,336,153

UNITED STATES PATENT OFFICE 2,336,153

FASTENING DEVICE

Charles D. Ryder, Covington, Ky., assignor to The National Colortype Company, Bellevue, Ky., a corporation of Kentucky Application December 13, 1941, Serial No. 422,907

7 Claims. (Cl. 85—5)

This invention deals with fastening devices for securing a plurality of parts into a relatively permanent assembly and is an improvement of my copending application Serial No. 404,682, filed July 30, 1941.

It is an object of this invention to provide a fastening device adapted to prepare a hole in a sheet for receiving a member to be secured thereto, the member received into the fastening device cooperating therewith to lock the inserted member within the fastening device.

Another object of this invention is to provide a substantially cylindrical spring clip for insertion in a hole in a sheet which is adapted to cooperate with a member to be positioned within the hole of the sheet for locking the same therein.

Still another object of the invention is to provide a relatively inexpensive clip adapted to cooperate with a member to be inserted in a hole in a sheet for securing the member within the hole.

A further object of this invention is to provide a fastening device adapted to secure together a plurality of sheets by insertion of the device within cooperating holes in adjacent sheets.

Another object of this invention is to provide a substantially tamper proof fastening device for securing two or more parts in substantially permanent relationship.

It is another object of this invention to provide a fastening device adapted to secure a plurality of parts which may be inserted into a hole in one of said parts and locked therein and is adapted to receive and lock in position a screw thread.

These and other objects and advantages of the fastening device of my invention will be made apparent by perusal of the following description and reference to the drawing in which:

Fig. 1 is a side elevational view, partly in cross section, taken along the line 1—1 of Fig. 3 illustrating the fastening device of my invention cooperating with rod means to hold a member permanently attached to said rod means in desired juxtaposition with a sheet member;

Fig. 2 shows diagrammatically the fastening device of my invention with relation to a hole in a sheet and a rod member which is to be associated with said sheet as shown in Fig. 1;

Fig. 3 is a cross sectional view taken along the line 3—3 of Fig. 1;

Fig. 4 is an end view taken along the line 4—4 of Fig. 1;

Fig. 5 is a diagrammatic view, partly in cross section, showing the fastening device of my invention cooperating with screw means to hold two sheets in desired juxtaposition;

Fig. 6 is a diagrammatic view illustrating the component parts of the assembly shown in Fig. 5;

Fig. 7 illustrates a blank from which is produced a fastening device of the type shown in Figs. 1 and 2; and Fig. 8 illustrates a blank such as used to produce the fastening device illustrated in Figs. 5 and 6.

In my copending application Serial No. 404,682, I have disclosed and claimed a fastening device consisting of a spring clip which is adapted to be positioned within a hole supplied in an element such as a metal sheet which is provided for carrying one or more members adapted to be assembled thereon. The member which is to be assembled upon the sheet is provided with one or more protrusions which are positioned within the spring clip to prevent the spring clip from being removed from the sheet. When the protrusion is forced completely within the spring clip, it cooperates with the clip to lock the member from which the protrusion projects to the metal sheet.

The spring clip, which is the subject of the present invention, is an improvement over that described in my above mentioned copending application in view of the fact that according to my present invention it is not necessary to provide the member which is to be assembled upon the metal sheet with any protrusions. The absence of the necessity for providing such member with protrusions thereon reduces the cost of manufacturing it, while the changes embodied in the construction of the spring clip of my invention in order to make it suitable for use in cooperation with members not provided with such protrusions do not increase the cost thereof.

Furthermore, one of the modifications of the fastening device of my present invention is adapted for use in cooperation with screw means, while the fastening device disclosed and claimed in my previously mentioned copending application is not adapted for such use.

This particular modification possesses certain specific advantages and may be employed in certain work wherein the fastening device disclosed and claimed in my previously mentioned copending application could not find use.

Referring to the drawing in detail, and particularly to Fig. 1, 10 is a rod member permanently attached to a member 11 which is to be mounted by means of spring clip 12 on sheet member 13.

As will be more clearly noted by reference to Fig. 2, the spring clip 12 is provided with a flange 14, a groove 15, a slit 16 and a plurality of prongs 17.

The size of the groove 15 and flange 14 will depend on the size of the elements to be united by the use of the spring clip 12. Generally speaking, the width of the groove 15 should be slightly less than the thickness of the sheet member 13 in order that the sheet member 13 may press down on the shoulder 18 thereby forcing the prongs 17 firmly against the rod member 10. This causes the prongs firmly to lock the rod member 10 and prevents its withdrawal. In other words, the rod member 10 may be inserted through the aperture at the wider end of the spring clip 12 but it cannot be withdrawn. This locking effect is obtained without the necessity of having protrusions on the rod member 10 cooperating with the prongs 17 of the spring clip 12 and results from the fact that the number of prongs 17 is relatively large and the total surface contact between the ends of the prongs 17 and the rod member 10 is great.

Referring now to Figs. 5 and 6, 19 is a screw member, 20 is a spring clip cooperating therewith, and 21 and 22 are sheet members held in juxtaposition by the combined action of screw member 19 and spring clip 20.

It will be noted by reference to Figs. 5 and 6 that the spring clip 20 has prongs 23 which are of dissimilar length, while the spring clip 12, shown in Figs. 1 and 2, has prongs 17 which are of identical length. The reason for this difference is that the spring clip 20 is for use in cooperation with a threaded member such as screw means 19 wherein it is advantageous to have the ends of the prongs engage more than one thread in order to provide a more substantial engagement between the spring clip and the screw member.

Referring now to Fig. 7, it will be noted that both ends of the blank are of identical size so that when the spring clip is formed from the blank, each of the prongs will be of the same length.

On the other hand, referring to Fig. 8, it will be noted that the ends of the blank are of different size so that when the spring clip is formed the prongs will be of various lengths in order to agree with the pitch of the threads of the screw member with which they are to cooperate in use.

The assembly illustrated in Figs. 1 and 2 is of particular advantage for mounting reflector buttons such as used on road markers and advertising signs and for use in connection with elements to be permanently mounted.

On the other hand, the assembly illustrated in Figs. 5 and 6 is of particular advantage in mounting elements which are to be dismountable.

In either case, however, the use of the spring clip or fastening device of my invention proves distinctly advantageous since the spring clip and the rod member or screw member to be held thereby are inserted from the same side.

In the case of tail and wing structures in aircraft, for example, it is extremely difficult to rivet a plurality of light weight sheets because of the inaccessibility of the inner portion of the structure, but with the spring clip of my invention, it is a simple matter to insert the clip and then press the rivet into it. It will be remembered that, as has been stated hereinbefore, a rod member may be pushed through the spring clip but it cannot be withdrawn and consequently when a rivet is introduced and firmly pressed, it will be locked in place and will not loosen up through vibration or otherwise.

Furthermore, where removable covers have to be screwed in place in structures the inner portions of which are relatively inaccessible, it is highly difficult at times and always wasteful of labor to introduce a screw from the outside and then hold a nut and lock washer on the inside. This operation requires two men, one to hold the nut and lock washer and the other to turn the screw. However, using the fastening device of my invention, it is a simple matter for one man to introduce the spring clip in the hole in the under sheet, placing the cover thereover with the holes in juxtaposition, and then introduce the screw.

In order to prevent movement of the spring clip with relation to the sheet member on which it is mounted, it is advantageous, after inserting the clip, to tap with a hammer or press with the end of a screw driver or other similar tool the open ends of the flange 14 (see Fig. 2) or the flange 24 (see Fig. 6) as the case might be, thereby bringing said ends into frictional engagement with the inner surface of the hole. This prevents rotation of the spring clip within the hole wherein it has been inserted. As will be noted by reference to Fig. 3, the ends 25 and 26 are bent down and inwardly for the purpose of obtaining this engagement and thereby preventing rotary movement of the clip within the hole.

It will be understood that while I have illustrated the member 11 (see Fig. 1) and the member 22 (see Figs. 5 and 6) as having a recess on the face thereof for the purpose of accommodating the flange 14 and the flange 24, respectively, it is not necessary to have such a recess excepting in cases where it is necessary or advantageous to have a perfect union between the two members to be assembled together by means of the spring clip and its cooperating rod member or screw member.

From the foregoing description and modifications illustrated in the drawing, it will be understood by those skilled in the art that the fastening device of my invention is adapted for a diversity of uses. It will be thus understood that while I have described and illustrated certain specific embodiments of my invention, it is not my intention to have it limited to or circumscribed by the specific details of construction and arrangement of parts herein set forth and illustrated, since my invention is to be comprehended within the scope of the appended claims.

I claim:

1. A fastening device adapted for securing a plurality of members in adjacent relationship which comprises: a substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; a plurality of prongs on said spring clip on the end opposite said flange, said prongs being arched inwardly and having flat-faced ends adapted to cooperate with a substantially cylindrical body insertable within said spring clip member, whereby said prongs are adapted to prevent return movement of said body with respect to said spring clip and said body is held firmly by said spring clip.

2. A fastening device adapted for securing a plurality of members in adjacent relationship which comprises: a substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; a plurality of prongs on said spring clip on the end opposite said flange, said prongs being arched inwardly and having flat faced ends adapted to cooperate with a substantially smooth and cylindrical body insertable within said spring clip member, whereby said prongs are adapted to prevent return movement of said body with respect to said spring clip and said body is held firmly by said spring clip.

3. A fastening device adapted for securing a plurality of members in adjacent relationship which comprises: a substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; an annular shoulder adjacent said groove on the side opposite said flange, said annular shoulder and said flange forming said groove; a plurality of prongs on said spring clip extending substantially from said shoulder to the end of said spring clip opposite said flange, said prongs being arched inwardly and having flat faced ends adapted to cooperate with a substantially smooth and cylindrical body insertable within said spring clip member, whereby said prongs are adapted to prevent return movement of said body with respect to said spring clip and said body is held firmly by said spring clip.

4. A fastening device adapted for securing a plurality of members in adjacent relationship which comprises: a substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; an annular shoulder adjacent said groove on the side opposite said flange, said annular shoulder and said flange forming said groove; a plurality of prongs on said spring clip extending substantially from said shoulder to the end of said spring clip opposite said flange, said prongs being of graduated dissimilar length and arched inwardly and having flat faced ends adapted to cooperate with a threaded member insertable within said spring clip member.

5. A fastening device adapted for securing a plurality of members in adjacent relationship which comprises: a longitudinally slit substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; an annular shoulder adjacent said groove on the side opposite said flange, said annular shoulder and said flange forming said groove; a plurality of slits on said clip running from substantially said shoulder to the end opposite said flange and forming a plurality of prongs on said spring clip extending substantially from said shoulder to the end of said spring clip opposite said flange, said prongs being arched inwardly and having flat faced ends adapted to cooperate with a substantially smooth and cylindrical body insertable within said spring clip member, said prongs being further adapted to prevent return movement of said body with respect to said spring clip, whereby said body is held firmly by said spring clip.

6. A fastening device adapted for securing a plurality of members in adjacent relationship which comprises: a longitudinally slit substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; a plurality of prongs arched inwardly and having flat faced ends on said spring clip on the end opposite said flange, said prongs being of graduated dissimilar length and adapted to cooperate with a threaded member insertable within said spring clip member.

7. A fastening device adapted for securing a plurality of members in adjacent relationship which comprises; a longitudinally slit substantially cylindrical spring clip member having an annular groove therein adapted to engage the edge of a hole provided in one of said members; flange means in said spring clip adjacent said groove adapted to engage the outer surface of one of said members adjacent the hole provided therein; a V-shaped section cut away across said flange and said groove with the closed end of the V lying in said groove; a slit running from the closed end of the V to the end of the clip opposite said flange; outwardly flaring ears on the corners formed by the open end of the V, said ears being adapted to "bite" into and firmly to engage the edge of the hole in said member adjacent said ears whereby to prevent rotation of said clip in said hole; an annular shoulder adjacent said groove on the side opposite said flange, said annular shoulder and said flange forming said groove; a plurality of prongs arched inwardly and having flat faced ends on said spring clip on the end opposite said flange, said prongs being of graduated dissimilar length and adapted to cooperate with a threaded member insertable within said spring clip member.

CHARLES D. RYDER.